United States Patent
Pedrinelli et al.

(10) Patent No.: US 12,227,038 B2
(45) Date of Patent: Feb. 18, 2025

(54) PNEUMATIC TYRE EQUIPPED WITH A TRANSPONDER

(71) Applicant: Bridgestone Europe NV/SA, Zaventem (BE)

(72) Inventors: Marco Pedrinelli, Rome (IT); Emiliano Sabetti, Rome (IT); Mauro Mirabile, Rome (IT); Emanuele Rosa, Rome (IT); Robin Arends, Rome (IT); Cristiano Pomposini, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 736 days.

(21) Appl. No.: 17/428,156

(22) PCT Filed: Feb. 4, 2020

(86) PCT No.: PCT/IB2020/050871
§ 371 (c)(1),
(2) Date: Aug. 3, 2021

(87) PCT Pub. No.: WO2020/161617
PCT Pub. Date: Aug. 13, 2020

(65) Prior Publication Data
US 2022/0055426 A1    Feb. 24, 2022

(30) Foreign Application Priority Data
Feb. 4, 2019   (IT) .................. 102019000001575

(51) Int. Cl.
*B60C 23/04* (2006.01)
*B60C 15/00* (2006.01)
*B60C 15/06* (2006.01)

(52) U.S. Cl.
CPC ...... *B60C 23/0493* (2013.01); *B60C 15/0603* (2013.01); *B60C 23/0447* (2013.01); *B60C 2015/009* (2013.01); *B60C 2015/061* (2013.01)

(58) Field of Classification Search
CPC .................. B60C 2019/004; B29D 2030/0077
See application file for complete search history.

(56) References Cited

U.S. PATENT DOCUMENTS

| 4,911,217 A | 3/1990 | Dunn et al. |
| 5,181,975 A | 1/1993 | Pollack et al. |

(Continued)

FOREIGN PATENT DOCUMENTS

| CN | 101823413 A | 9/2010 |
| CN | 104428148 A | 3/2015 |

(Continued)

OTHER PUBLICATIONS

English machine translation of FR 2 936 977 A1, Apr. 16, 2010.*

(Continued)

*Primary Examiner* — Adrienne C. Johnstone
(74) *Attorney, Agent, or Firm* — Sughrue Mion, PLLC

(57) ABSTRACT

Pneumatic tyre having a toroidal carcass, which has a body ply that is partially folded onto itself and therefore having two lateral flaps; two annular beads, each of which is surrounded by the body ply and has a bead core and a bead filler; an annular tread; a pair of sidewalls; a pair of abrasion gum strips; an innerliner which is impermeable to air and is arranged within the body ply; and a transponder which is arranged between the body ply and the innerliner at a flap of the body ply and is arranged at a distance of less than 7 mm from an edge of the body ply.

12 Claims, 11 Drawing Sheets

(56) References Cited

U.S. PATENT DOCUMENTS

| | | | |
|---|---|---|---|
| 6,371,178 | B1 | 4/2002 | Wilson |
| 2002/0093422 | A1* | 7/2002 | Shimura ............. B60C 23/0493 |
| 2004/0252072 | A1 | 12/2004 | Adamson et al. |
| 2012/0291936 | A1 | 11/2012 | Lionetti et al. |
| 2020/0108672 | A1* | 4/2020 | Hosomi |
| 2020/0108673 | A1* | 4/2020 | Nagayoshi ............... B60C 19/00 |
| 2020/0108675 | A1* | 4/2020 | Takagi .................... B60C 19/00 |
| 2020/0398615 | A1* | 12/2020 | Ohta ....................... B60C 19/00 |

FOREIGN PATENT DOCUMENTS

| | | | |
|---|---|---|---|
| EP | 2 186 658 | A1 | 5/2010 |
| FR | 2 936 977 | A1 * | 4/2010 |
| JP | 2004-82775 | A | 3/2004 |
| JP | 2005-524572 | A | 8/2005 |
| JP | 2012-66632 | A | 4/2012 |
| KR | 10-2008-0046816 | A | 5/2008 |
| KR | 10-2010-0082464 | A | 7/2010 |
| KR | 10-2013-0067944 | A | 6/2013 |
| WO | 2018/104611 | A1 | 6/2018 |
| WO | 2018/104621 | A1 | 6/2018 |
| WO | WO-2018/224196 | A1 * | 12/2018 |
| WO | WO-2020/108833 | A1 * | 6/2020 |
| WO | WO-2020/229023 | A1 * | 11/2020 |
| WO | WO-2021/058903 | A1 * | 4/2021 |
| WO | WO-2021/106918 | A1 * | 6/2021 |
| WO | WO-2021/111075 | A1 * | 6/2021 |

OTHER PUBLICATIONS

English machine translation of WO 2018/224196 A1, Dec. 13, 2018.*
English machine translation of WO 2020/108833 A1, Jun. 4, 2020.*
English machine translation of WO 2020/229023 A1, Nov. 19, 2020.*
English machine translation of WO 2021/058903 A1, Apr. 1, 2021.*
English machine translation of WO 2021/106918 A1, Jun. 3, 2021.*
English machine translation of WO 2021/111075 A1, Jun. 10, 2021.*
Japanese Office Action dated Feb. 13, 2024 in Application No. 2021-545433.
Office Action issued Jan. 12, 2023 in Chinese Application No. 202080021583.X.
International Search Report for PCT/IB2020/050871 dated May 6, 2020 (PCT/ISA/210).
Written Opinion of the International Searching Authority for PCT/IB2020/050871 dated, May 6, 2020 (PCT/ISA/237).

* cited by examiner

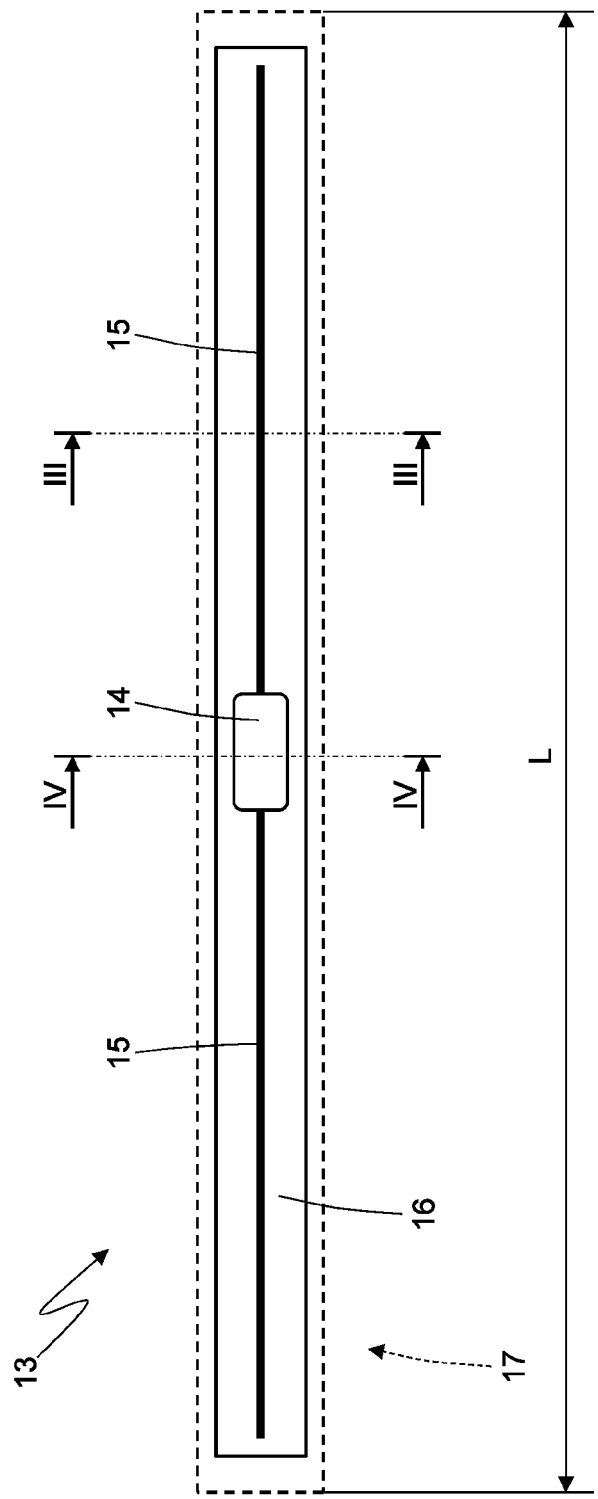

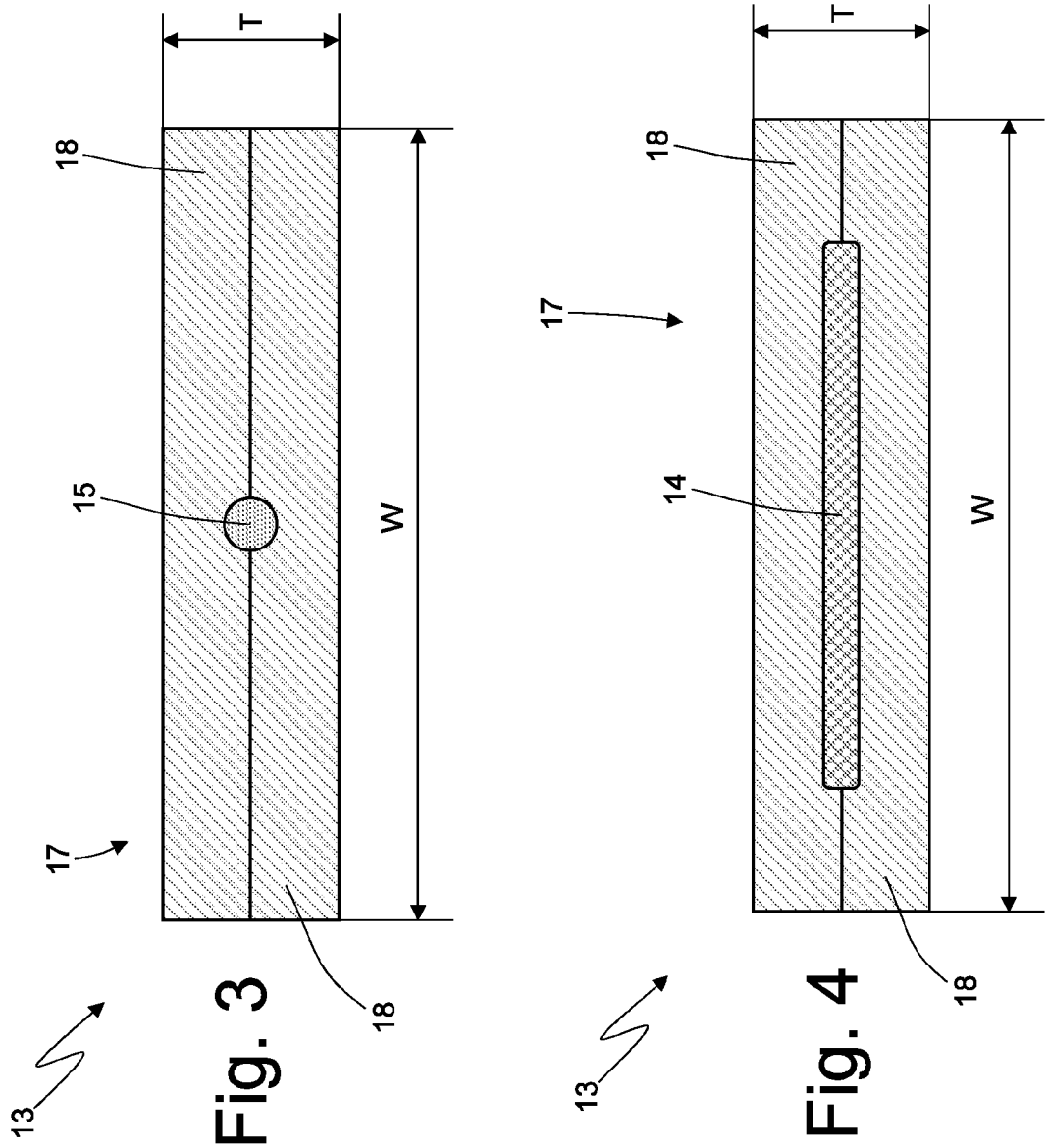

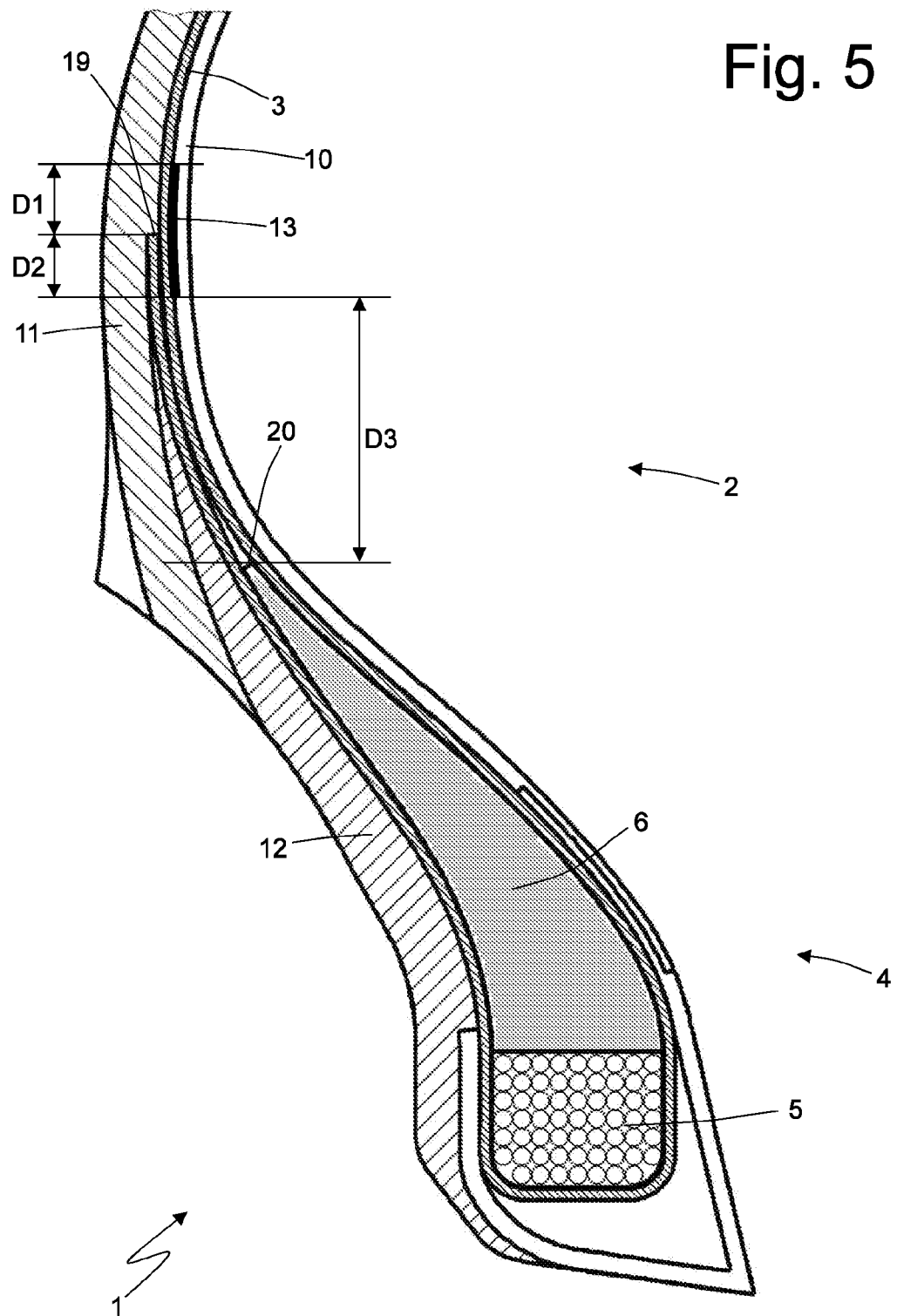

PNEUMATIC TYRE EQUIPPED WITH A TRANSPONDER

CROSS-REFERENCE TO RELATED APPLICATIONS

This application is a National Stage of International Application No. PCT/IB2020/050871 filed Feb. 4, 2020 claiming priority based on Italian Patent Application No. 102019000001575 filed on Feb. 4, 2019, the entire disclosure of which is incorporated herein by reference.

TECHNICAL SECTOR

The present invention relates to a pneumatic tyre equipped with a transponder.

PRIOR ART

In recent years, so-called "smart" pneumatic tyres have emerged, which are capable of forming an active part of modern vehicles, supplying information concerning the type of pneumatic tyres mounted, information concerning the status of the pneumatic tyres and also information concerning ambient conditions.

A "smart" pneumatic tyre is normally equipped with a transponder (i.e., an electronic device suitable for communicating in radio frequency) which permits remote communication (i.e., to both the vehicle whereupon the pneumatic tyre is mounted and to an operator who must carry out the checking or the replacement of the pneumatic tyre) of the identification, the characteristics and the history of the pneumatic tyre.

Recently, the unification has been proposed of RFID ("Radio-Frequency IDentification") technology, based upon the presence of transponders, and TPMS ("Tyre Pressure Monitoring Systems") technology, which measures the effective inflation pressure in order to memorize, within transponders, the effective inflation pressure and then remotely communicate the effective inflation pressure by means of the transponders themselves.

Initially, it was proposed to glue a transponder onto the inner surface or onto the external surface of a sidewall of a pneumatic tyre; this solution is extremely simple from a design perspective and is applicable also to existing pneumatic tyres; however, by contrast, it does not guarantee that the transponder will not detach from the pneumatic tyre (especially when it is glued to the external surface) following the cyclical deformations to which the sidewall of a pneumatic tyre is subjected.

Thereafter, the integration of a transponder within the structure of a pneumatic tyre was proposed, that is, within the interior of the various layers that make up the pneumatic tyre.

The patent application US20080289736A1 describes a pneumatic tyre wherein a transponder is integrated into the structure of the pneumatic tyre at the bead; in particular the transponder is arranged between a sidewall and a bead filler above the flap of the body ply.

The patent application EP2186658A1 describes a pneumatic tyre wherein a transponder is integrated into the structure of the pneumatic tyre at the bead; in particular the transponder is arranged between a sidewall and a bead filler above the flap of the body ply, or else the transponder is arranged between a bead filler and the body ply (i.e., within the flap of the body ply).

The patent application EP1366931A2 describes a pneumatic tyre wherein a transponder is integrated into the structure of the pneumatic tyre at the bead; in particular the transponder is immersed within the bead filler and is located within the flap of the body ply or the transponder is immersed within the rubber arranged more to the inside with respect to the bead core (therefore, it is located on the exterior of the flap of the body ply).

The patent applications KR20100082464A1 and KR20130067944A1 describe a pneumatic tyre wherein a transponder is integrated into the structure of the pneumatic tyre above the bead filler; in particular, the transponder is embedded (inserted) within the body ply and is located at least partially within the flap of the body ply.

Nevertheless, the above-described positionings of the transponder within a pneumatic tyre are not ideal, because they do not make it possible to minimize the stresses and deformations to which the transponder is subjected (both during the construction of the pneumatic tyre and during the use of the pneumatic tyre) and, at the same time, to minimize transponder radio frequency communications disturbances and interference.

DESCRIPTION OF THE INVENTION

The aim of the present invention is to provide a pneumatic tyre equipped with a transponder that is free from the disadvantages described above and that is, in particular, easy and inexpensive to implement.

According to the present invention, a pneumatic tyre equipped with a transponder is provided, as set forth herein.

The claims describe preferred embodiments of the present invention forming an integral part of the present description.

BRIEF DESCRIPTION OF THE DRAWINGS

The present invention is now described with reference to the attached drawings, which illustrate several non-limiting exemplary embodiments, wherein:

FIG. 2 is a schematic view of a transponder of the pneumatic tyre of FIG. 1;

FIGS. 3 and 4 are two views in cross section of the transponder of FIG. 2 according to the section line III-III and according to the section line IV-IV, respectively;

FIGS. 5, 6 and 7 are three enlarged scale views of a detail of FIG. 1 according to three alternative embodiments;

PREFERRED EMBODIMENTS OF THE INVENTION

Figure 1:
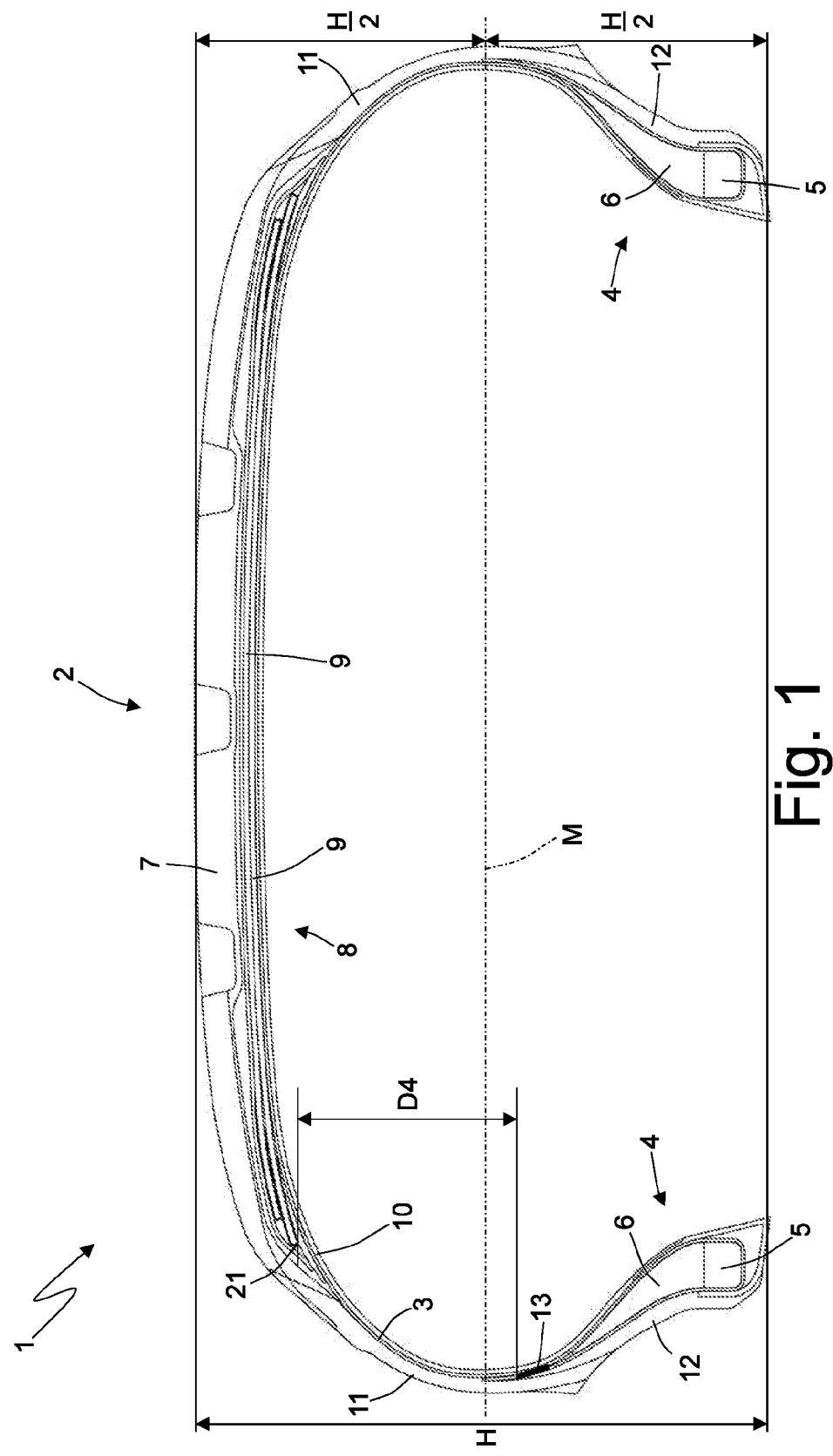
FIG. 1 is a schematic cross section, with parts removed for clarity, of a pneumatic tyre manufactured according to the present invention.

In FIG. 1 a pneumatic tyre is indicated as a whole by the number 1 and comprises a toroidal carcass 2, which comprises a single body ply 3 partially folded onto itself and therefore having two lateral flaps, i.e., two layers superimposed on one another and jointly referred to as "turn-up"). Within each flap of the body ply 3, an edge (i.e., a terminal end) of the body ply 3 rests against an intermediate portion of the body ply 3 itself.

On the opposite sides of the carcass 2, two annular beads 4 are arranged, each of which is surrounded by the body ply 3 (i.e., it is surrounded by the flaps of the body ply 3), and has a bead core 5 which is reinforced with a number of windings of a metallic wire and a bead filler 6.

The carcass 2 supports an annular tread 7; a tread belt 8, comprising two tread plies 9, is interposed between the carcass 2 and the tread 7. Each tread ply 9 comprises a number of cords (not shown), which are embedded within a rubber belt. They are arranged alongside one another with a given pitch and form an angle of inclination that is determined with an equatorial plane of the pneumatic tyre 1.

Arranged within the body ply 3 is an innerliner 10, which is airtight, constitutes an inner lining and has the function of retaining the air within the pneumatic tyre 1 in order to maintain the inflation pressure of the same pneumatic tyre 1 over time.

The body ply 3 supports a pair of sidewalls 11 arranged externally to the body ply 3, between the tread 7 and the beads 4.

Finally, the body ply 3 supports a pair of abrasion gum strips 12 arranged externally below the sidewalls 11 and at the beads 4.

According to what is shown in FIG. 1, the cross section of the pneumatic tyre 1 has an overall height H (a thickness, i.e., a radial dimension measured perpendicularly to the axis of rotation of the pneumatic tyre); identified in FIG. 1 is the medial plane M of the height H of the cross section of the pneumatic tyre 1 (i.e., the plane M bisects the height H of the cross section of the pneumatic tyre 1, subdividing the height H of the cross section of the pneumatic tyre 1 into two identical halves, each having a height of H/2).

A transponder 13, i.e., an electronic device (normally passive, i.e., without an electrical power supply thereof) which is capable of memorizing information and capable of communicating by radio frequency, is integrated (embedded) within the interior of the pneumatic tyre 1, in particular at a sidewall 11 (for example, the external sidewall 11, i.e., the sidewall facing the exterior of the vehicle once the pneumatic tyre 1 has been mounted on the rim). In other words, the transponder 13 is a "smart label" of small dimensions which is integrated within the pneumatic tyre 1 and is suitable for responding to the remote polling by specific fixed or portable devices, called readers (or else polling devices); a reader is capable of reading and/or modifying the information contained within the transponder 13 i.e., polling whilst communicating with the transponder itself 13 in radio frequency. Accordingly, the transponder 13 is a part of a wireless reading and/or writing system that operates according to so-called RFID technology ("Radio-Frequency IDentification").

According to what is shown in FIG. 2, the transponder 13 comprises an electronic circuit 14 (i.e., a microchip) equipped with a non-volatile memory (typically, EEPROM or FRAM, the latter more costly, but technologically more advanced), an antenna 15 connected to the electronic circuit 14, and a support 16, which carries both the electronic circuit 14 and the antenna 15 and is frequently defined as a "substrate" (typically it is made of a thin layer of mylar, plastic like PET or PVC, or other similar materials). In the embodiment shown in FIG. 2, the antenna 15 is a dipole antenna (or simply a dipole) and is made of two equal open arms constructed with a linear electrical conductor whereupon the electrical currents flow that remotely irradiate the electromagnetic field.

In use, the antenna 15 receives an electromagnetic signal that, by electromagnetic induction, induces a difference in electrical potential in the antenna 15, which generates the circulation of an electrical current in the electronic circuit 14 to supply power to the electronic circuit 14 itself; the electronic circuit 14, thus activated, transmits the data contained within the memory thereof by means of the antenna 15 and, where appropriate, also modifies the data contained within the memory thereof.

According to what is shown in FIGS. 2, 3 and 4, the transponder 13 is inserted into a sleeve 17, consisting of two strips 18 of green rubber superimposed and pressed one against the other (obviously, the rubber of the two strips 18 of rubber is initially raw and is vulcanized together with the rest of the pneumatic tyre 1 during the final vulcanization of the pneumatic tyre 1 itself); in general, the two strips 18 of green rubber of the sleeve 17 are 1-2 mm longer/wider than the transponder 13 (i.e., than the electronic circuit 14 and the antenna 15). The two strips 18 of green rubber are initially parallelepiped and deform around the components of the transponder 13 when they are pressed one against the other around the transponder 13 itself. According to an alternative embodiment, the two strips 18 of rubber of the sleeve 17 are vulcanized from the start (that is, the rubber of the two strips 18 of rubber is vulcanized immediately).

According to a different embodiment (not shown), the support 16 is absent and the function thereof is performed by the strips 18 of rubber of the sleeve 17.

According to a preferred embodiment, the thickness T of the sleeve 17 (containing the transponder 13 within it) is overall between 0.6 and 2 mm, the width W of the sleeve 17 is about 8-12 mm, and the length L of the sleeve 17 is about 60-80 mm.

Figure 6:
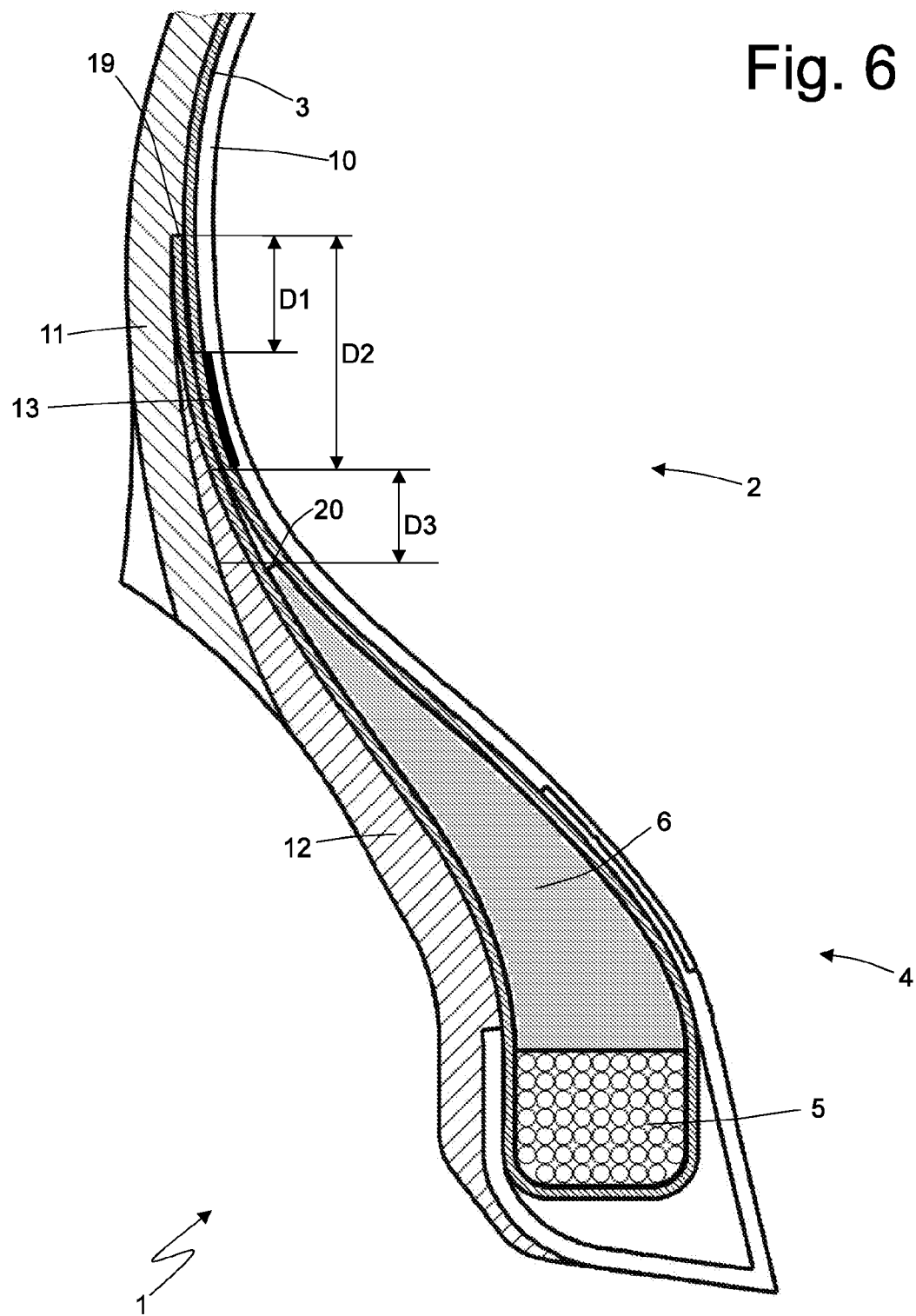

The transponder 13 is arranged circumferentially, i.e., it is arranged along a circumference centered upon the axis of rotation of the pneumatic tyre (i.e., a larger—longitudinal—dimension of the transponder 13 is arranged circumferentially); it is important to emphasize that the transponder 13 (contained within the sleeve 17) has a parallelepiped rectangular form, and therefore, within the pneumatic tyre 1, it does not follow the circular progression of all of the other components of the pneumatic tyre 1 (as schematically shown in FIG. 6).

Figure 7:
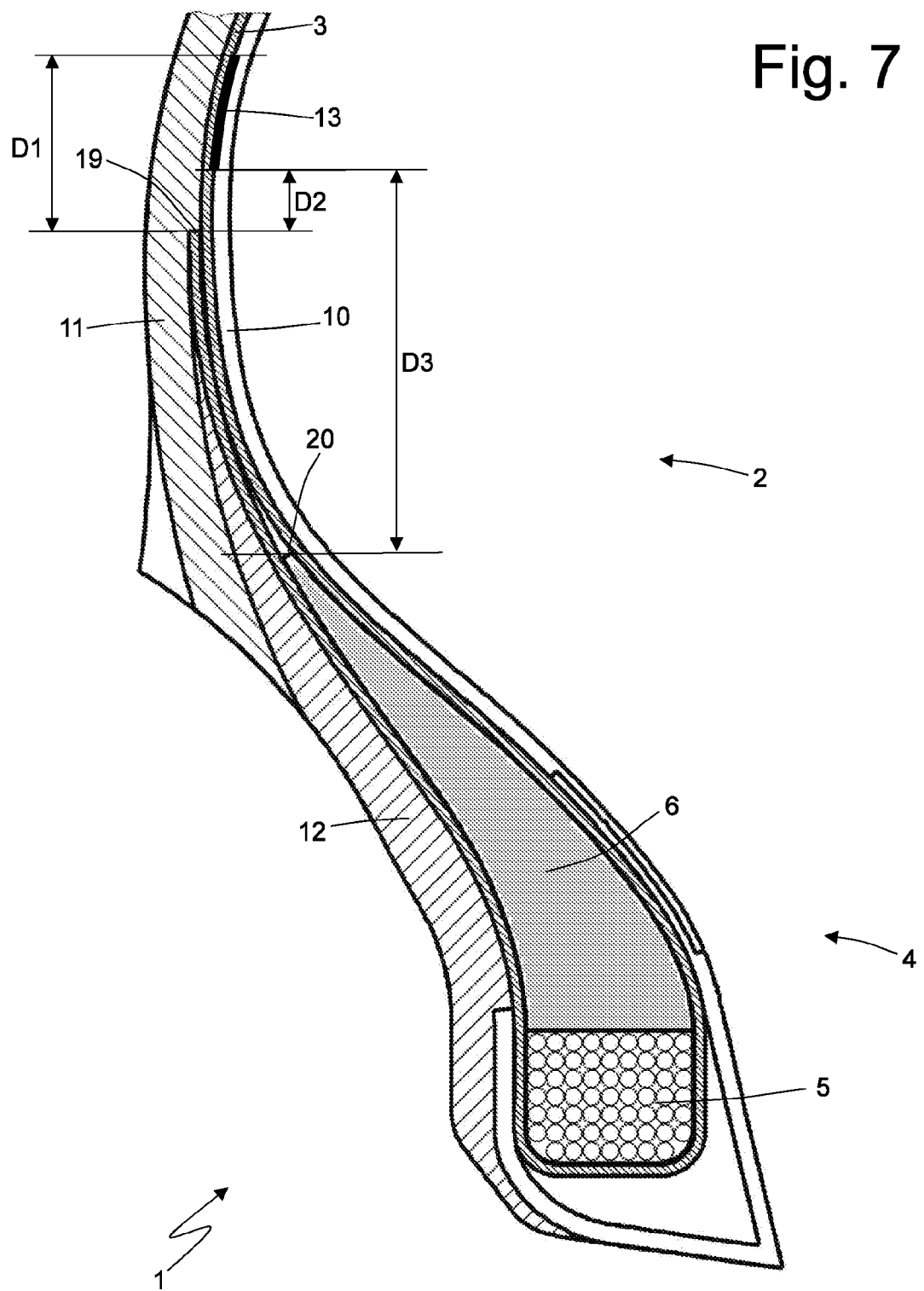

According to what is shown in FIGS. 5, 6 and 7, the transponder 13 (contained within the sleeve 17) is arranged in proximity to an edge 19 (i.e., a terminal end) of the body ply 3, i.e., the transponder 13 (contained within the sleeve 17) is arranged at a radial distance D1 and/or D2, not greater than 7 mm from the edge 19 of the body ply 3; in other words, a radially external end of the transponder 13 is located at the radial distance D1, not greater than 7 mm from the edge 19 of the body ply 3 and/or a radially inner end of the transponder 13 is located at the radial distance D2, not greater than 7 mm from the edge 19 of the body ply 3.

According to the embodiment shown in FIG. 5 a portion of the transponder 13 is radially at the same level as the edge 19 of the body ply 3, i.e., the transponder 13 is radially adjacent to the edge 19 of the body ply 3; in this case, the radially external end of the transponder 13 is located at the radial distance D1, not greater than 7 mm from the edge 19 of the body ply and, contemporaneously, the radially inner end of the transponder 13 is located at the radial distance D2, not greater than 7 mm from the edge 19 of the body ply 3.

According to the embodiment shown in FIG. 6, the transponder 13 (contained within the sleeve 17) is arranged below the edge 19 of the body ply 3 (with this embodiment the transponder 13 is completely arranged below the edge 19 but according to other embodiments could be only partially arranged below the edge 19); in this case, only the radially external end of the transponder 13 is located at the radial distance D1, not greater than 7 mm from the edge 19 of the body ply, whilst the radially inner end of the transponder 13 is located at the radially external radial distance D2 at 7 mm from the edge 19 of the body ply 3.

According to the embodiment shown in FIG. 7, the transponder 13 (contained within the sleeve 17) is located above the edge 19 of the body ply 3 (with this embodiment the transponder 13 is completely arranged above the edge but according to other embodiments could be only partially arranged above the edge 19); in this case, only the radially inner end of the transponder 13 is located at the radial distance D2, not greater than 7 mm from the edge 19 of the body ply, whilst the radially external end of the transponder 13 is located at the radial distance D1, greater than 7 mm from the edge 19 of the body ply 3.

In summary, the transponder 13 (contained within the sleeve 17) is arranged in proximity to the edge 19 of the body ply 3 (i.e., it is arranged at a radial distance D1 and/or D2, not greater than 7 mm from the edge 19 of the body ply 3) if:
 1. the transponder 13 (contained within the sleeve 17) is radially at the same level as the edge 19 of the body ply 3 (as illustrated in FIG. 5) and thus, the radially external end of the transponder 13 is located at the radial distance D1, not greater than 7 mm from the edge 19 of the body ply 3 and, at the same time, the radially inner end of the transponder 13 is located at the radial distance D2, not greater than 7 mm from the edge 19 of the body ply 3;
 2. the transponder 13 is arranged below the edge 19 of the body ply 3, in such a way that only the radially external end of the transponder 13 is located at the radial distance D1, not greater than 7 mm from the edge 19 of the body ply 3 (as shown in FIG. 6); or
 3. the transponder 13 is arranged above the edge 19 of the body ply 3, in such a way that only the radially inner end of the transponder 13 is located at the radial distance D2, not greater than 7 mm from the edge 19 of the body ply 3 (as shown in FIG. 7).

According to a preferred embodiment shown in FIGS. 5, 6 and 7 the transponder 13 is located above (radially higher than) the bead 4 and is therefore located above the bead filler 6; in particular, the transponder 13 (contained within the sleeve 17) is arranged at a radial distance D3 (not zero) from an edge 20 (i.e., a terminal end) of the beads 4 (in particular an edge of the bead filler 6, whereupon the bead filler 6 terminates); i.e., a radially inner edge (end) of the transponder 13 is arranged at a radial distance D3 from the edge 20 of the bead filler 6. The radial distance D3 between the transponder 13 and the edge 20 of the bead filler 6 is preferably equal to at least 10 mm (i.e., greater than 10 mm).

According to a preferred embodiment shown in FIG. 1, the transponder 13 is arranged at a radial distance D4 (not zero) from an edge 21 (i.e., a terminal end) of the tread belt 8, i.e., from the edge 21 of the innermost tread ply (as mentioned earlier, the tread belt 8 comprises two tread plies 9); i.e., a radially external edge (end) of the transponder 13 is arranged at the radial distance D4 from edge 19 of tread belt 8. The radial distance D4 between the transponder 13 and the edge 21 of the tread belt 8 is preferably equal to at least 10 mm (i.e., greater than 10 mm).

The transponder 13 (contained within the sleeve 17) is arranged between the body ply 3 and the innerliner 10, and therefore the transponder 13 is laterally (i.e., axially, or parallel to the axis of rotation of the pneumatic tyre 1) bordering (in direct contact) the body ply 3 on the external side and is laterally bordering (in direct contact) the innerliner 10 on the inner side. In other words, an external surface of the transponder 13 rests directly against (or touches) the body ply 3 and an inner surface of the transponder 13 rests directly against (or touches) the innerliner 10. The transponder 13 (contained within the sleeve 17) is arranged more to the inside of the flap of the body ply 3, and is therefore laterally (i.e., axially, or parallel to the axis of rotation of the pneumatic tyre 1) bordering the body ply 3 on one side (externally) and the innerliner 10 on the opposite side (internally); in other words, the transponder 13 is in contact externally with a corresponding portion of the body ply 3 and is in contact internally with a corresponding portion of the innerliner 10.

The transponder 13 is arranged at the flap of the body ply 3 and, therefore, in proximity to the transponder 13 it is "doubled", i.e., it is bent over upon itself, thereby forming a double layer.

According to a possible embodiment, the transponder 13 is arranged within an area wherein the sidewall 11 is present and where the abrasion gum strip 12 is absent, i.e., to the side of the transponder 13 (and more externally with respect to the transponder 13) the sidewall 11 is present and the abrasion gum strip 12 is absent. According to a different embodiment, the transponder 13 is arranged within an area wherein the abrasion gum strip 12 is present, i.e., to the side of the transponder 13 (and more externally with respect to the transponder 13) both the abrasion gum strip 12 and the sidewall 11 are present.

Figure 8:
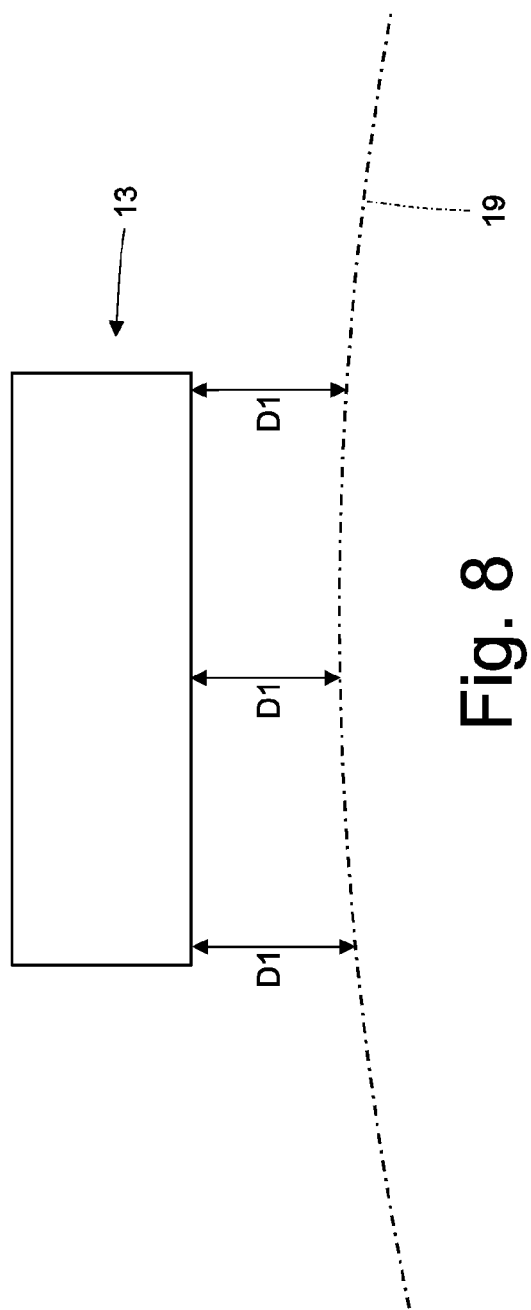
FIG. 8 is a schematic view that shows the arrangement of the transponder of FIG. 2 with respect to an edge of a body ply and with respect to an edge of a bead of the pneumatic tyre of FIG. 1.

As mentioned hereinbefore, the transponder 13 is arranged circumferentially and has a parallelepiped rectangular form, and within the pneumatic tyre 1 it does not follow the circular progression of all of the other components of the pneumatic tyre 1; as a result, as shown in FIG. 8, the radial distance D1 between an edge of the transponder 13 and the edge 19 of the body ply 3 is continuously variable (even if only by a maximum of 1-3 mm) along the entire extent of the transponder 13, inasmuch as the transponder 13 has a rectangular progression, while the edge 19 has a circular progression. In this respect, it is important to emphasize that the maximum radial distance D1 (i.e., the greatest possible) between an edge of the transponder 13 and the edge 19 of the body ply 3 is always less than 10 mm.

In the embodiment shown in FIGS. 1-8, the toroidal carcass 22 comprises a single body ply 3, which forms the two flaps surrounding the two beads 4. In the alternative embodiment shown in FIGS. 9 and 10, the toroidal carcass comprises two body plies 3a and 3b overlapping therebetween and in direct reciprocal contact: a main body ply 3a arranged internally (i.e., arranged more internally with respect to the additional body ply 3b) which is partially folded onto itself and therefore laterally having two flaps (i.e., two layers overlapping therebetween and commonly referred to as "turn-up"), and an additional body ply 3b, which is arranged externally (i.e., arranged more externally with respect to the main body ply 3a), is smaller than the main body ply 3a, overlaps the main body ply 3a, is devoid of flaps, and ends at the beads 4 without folding, in any way, around the beads 4 themselves.

Figure 9:
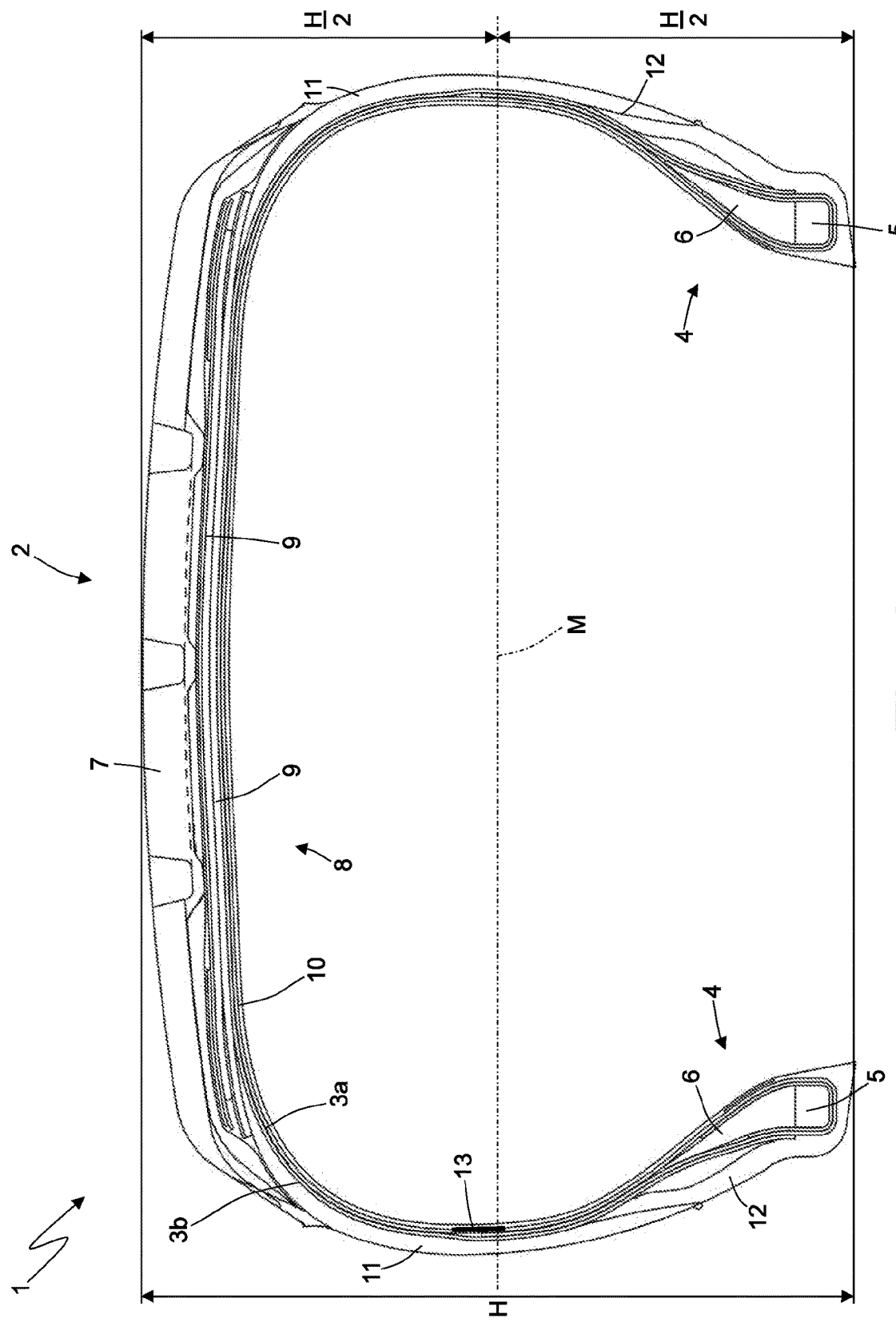
FIG. 9 is a schematic cross section, with parts removed for clarity, of a different embodiment of the pneumatic tyre of FIG. 1.
Figure 10:
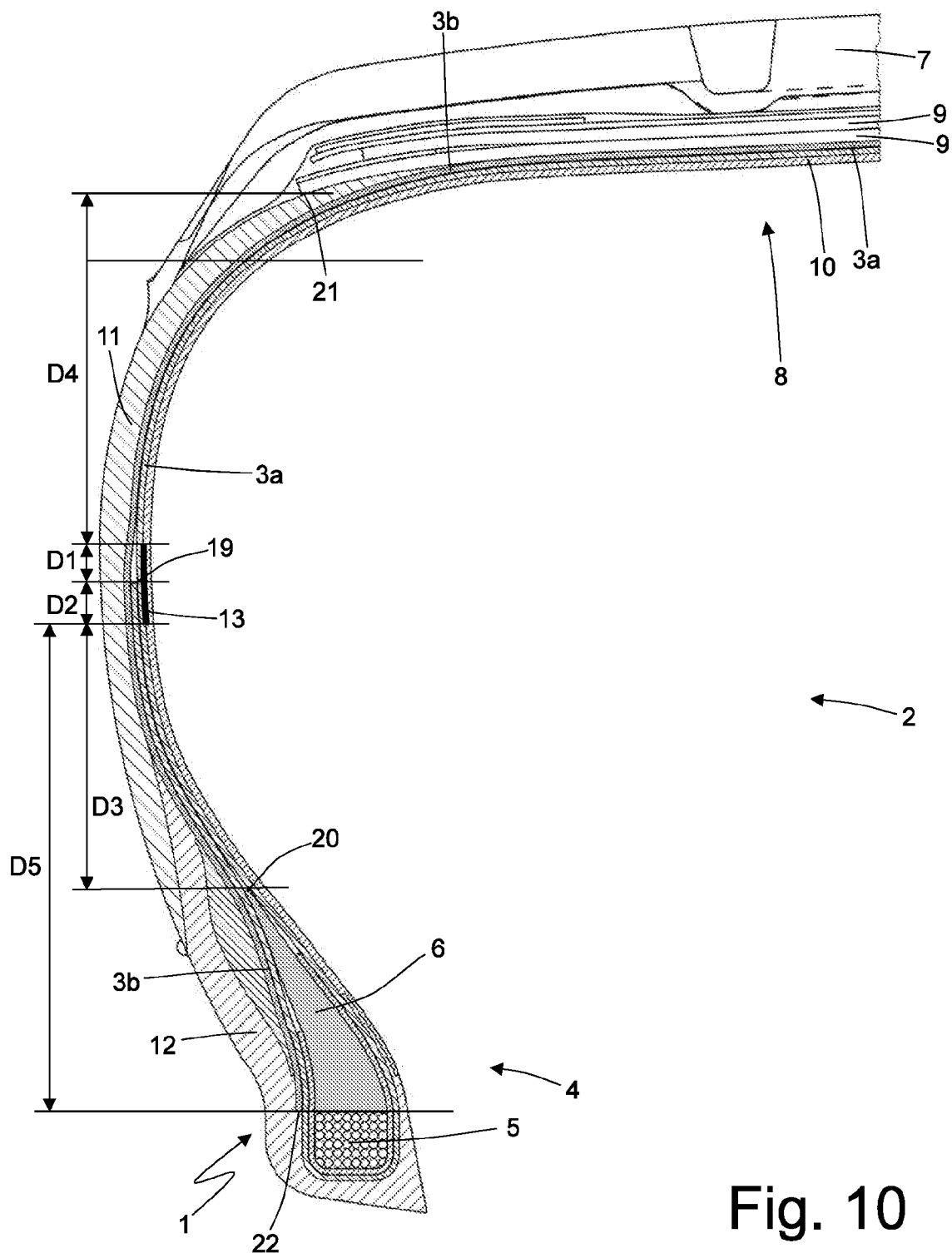
FIG. 10 is an enlarged scale view of a detail of FIG. 9.

In the embodiment shown in FIGS. 9 and 10, the additional body ply 3b is arranged externally with respect to the beads 4. In the embodiment shown in FIGS. 11 and 12, the additional body ply 3b is arranged internally with respect to the beads 4.

Furthermore, in the embodiment shown in FIGS. 9 and 10, the additional body ply 3b terminates at the beads 4, and therefore does not fold, in any way, around the beads themselves. In contrast, in the embodiment shown in FIGS. 11 and 12, the additional body ply 3b partially folds around the beads 4 but without however forming complete flaps as with the main body ply 3a, i.e., without closing over itself. According to other embodiments, not shown, the additional body ply 3b may also fold around the beads 4, forming complete flaps around the beads 4 themselves.

Also in the embodiment shown in FIGS. 9-12, the transponder 13 (contained within the sleeve 17) is arranged in proximity to the edge 19 (i.e., a terminal end) of the main body ply 3a and therefore the transponder 13 is arranged at a radial distance D1 and/or D2, not greater than 7 mm from the edge 19 of the main body ply 3a.

Also in the embodiment shown in FIGS. 9-12, the transponder 13 is arranged at a radial distance D3, greater than 10 mm from the edge 20 of the bead filler 6 and is arranged at the radial distance D4, greater than 10 mm from the edge 21 of the tread belt 8.

In the embodiment shown in FIGS. 9 and 10, the transponder 13 is arranged between the main body ply 3a and the innerliner 10, and therefore, the transponder 13 is laterally bordering (in direct contact) with the main body ply 3a on the external side and is laterally bordering (in direct contact) with the innerliner 10 on the inner side.

Figure 11:
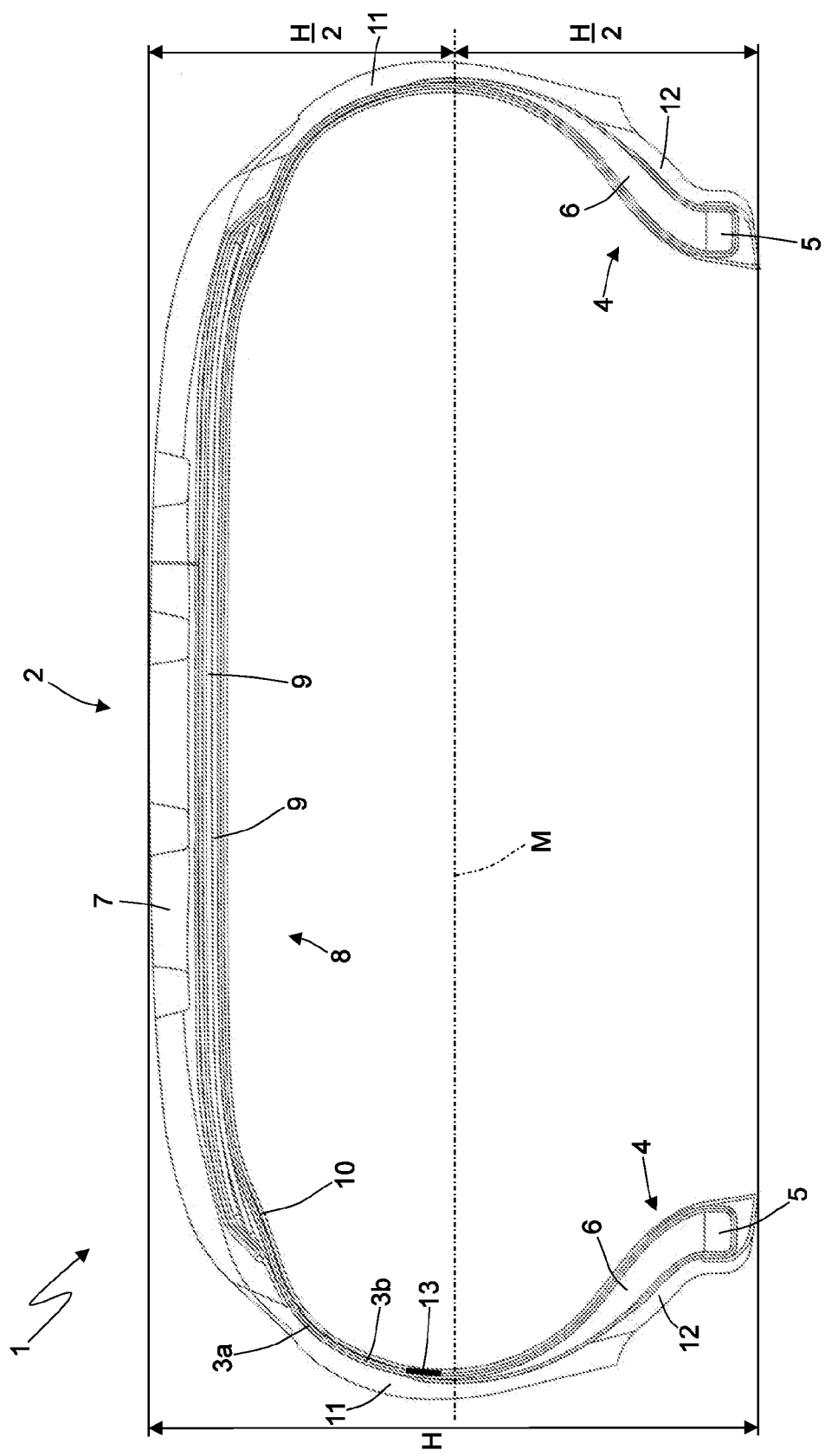
FIG. 11 is a schematic cross section, with parts removed for clarity, of a further embodiment of the pneumatic tyre of FIG. 1.
Figure 12:
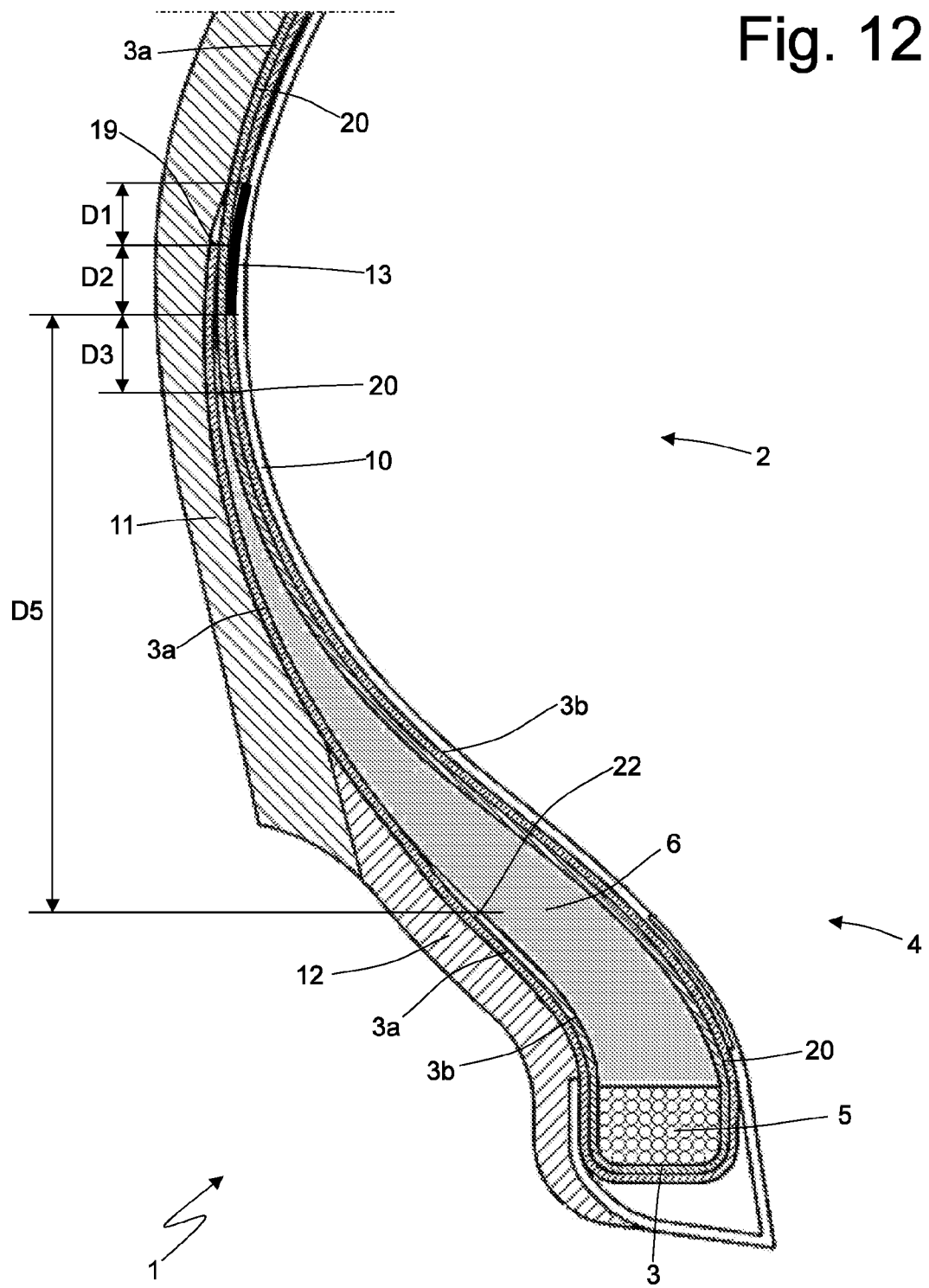
FIG. 12 is an enlarged scale view of a detail of FIG. 11.

In the embodiment shown in FIGS. 11 and 12, the transponder 13 is arranged between the additional body ply 3b and the innerliner 10, and therefore, the transponder 13 is laterally bordering (in direct contact) with the additional body ply 3b on the external side and is laterally bordering (in direct contact) with the innerliner 10 on the inner side.

In any case, the transponder 13 is always located more internally to both of the body plies 3a and 3b and is in direct contact with the innermost body plies 3a or 3b (which in the embodiment shown in FIGS. 9 and 10 is the main body ply 3a, whilst in the embodiment shown in FIGS. 11 and 12 it is the additional body ply 3b).

According to a preferred embodiment shown in FIGS. 10 and 12, the transponder 13 (contained within the sleeve 17) is arranged at a radial distance D5 (not zero) from an edge 22 (i.e., a terminal end) of the additional body ply 3b; i.e., the radially inner edge (end) of the transponder 13 is arranged at the radial distance D5 from the edge 22 of the additional body ply 3b. Preferably, the distance D5 is between 25 mm and 60 mm.

It is important to emphasize that the body ply 3 could be provided with local reinforcing elements that are applied to limited portions of the body ply 3 (or else of the main body ply 3a); for example, the body ply 3 (or else of the main body ply 3a) could be provided with fabric reinforcement, which is applied in proximity to the beads 4 and/or with a calendered "squeegee", which is also applied in proximity to the beads 4. In this case, such reinforcing elements become an integral part of the body ply 3 (or else of the main body ply 3a) and, therefore, the transponder 13 can be arranged in contact with the body ply 3 (or else with the main body ply 3a) also at such reinforcing elements.

The pneumatic tyre 1 can be of the "standard" type or else of the "non-standard" type; for example, the pneumatic tyre 1 could be of the "run-flat" type, of the "sponge" type (i.e., provided internally with a spongy body having an acoustic effect), or of the "sealant" type (i.e., provided with a sealing agent which is capable of closing any holes).

The embodiments described herein may be combined without departing from the scope of protection of the present invention.

The pneumatic tyre 1 described above has many advantages.

First and foremost, in the aforementioned pneumatic tyre 1 the position of the transponder 13 makes it possible to minimize the stresses and deformations to which the transponder 13 is subjected (both during the construction of the pneumatic tyre 1 and during the use of the pneumatic tyre 1) and, at the same time, makes it possible to minimize disturbances and interference with the radio frequency communications of transponder 13 (in this way, the transponder 13 can be read at a distance of over 3 meters if the pneumatic tyre 1 is not mounted on a metallic rim and at a distance of over 2 meters if the pneumatic tyre 1 is mounted on a metallic rim).

Furthermore, in the pneumatic tyre 1 described above the presence of the transponder 13 (which is nevertheless a "foreign object" immersed within the pneumatic tyre 1) does not have a negative impact upon the performance and the durability (or upon the operating life) of the pneumatic tyre 1 itself.

The transponder 13 is very well protected from the outside insofar as it is located more internally with respect to the body ply 3 (or both of the body plies 3a and 3b). Furthermore, local deformations to the body ply 3 (or both of the body plies 3a and 3b) are avoided and the risk of trapping air within the body ply 3 (or within both of the body plies 3a and 3b) is completely avoided at the transponder 13, because the space for housing the transponder 13 is located externally with respect to the body ply 3 (or both of the body plies 3a and 3b) by means of a bulge towards the inside of the innerliner 10.

Finally, the construction of the pneumatic tyre 1 described above is simple insofar as the transponder 1 can easily be made to adhere to the body ply 3 (or to the main body ply 3a or to the additional body ply 3b) when the body ply 3 (or the main body ply 3a or the additional body ply 3b) is still completely flat (i.e., before winding the body ply 3—or the main body ply 3a or the additional body ply 3b—around the molding drum) or else the transponder 1 can easily be made to adhere to the innerliner 10 prior to mounting the innerliner 10 itself.

LIST OF REFERENCE NUMBERS IN THE FIGURES 1 pneumatic tyre
2 carcass
3 body ply
4 beads
5 bead core
6 bead filler
7 tread
8 tread belt
9 tread plies
10 innerliner
11 sidewalls
12 abrasion gum strips
13 transponder
14 electronic circuit
15 antenna
16 support 17 sleeve
18 strips
19 edge
20 edge
21 edge
22 edge
H height
L length
W width
T thickness
D1 distance
D2 distance
D3 distance
D4 distance
D5 distance

The invention claimed is:

1. A pneumatic tyre (1) comprising:
a toroidal carcass (2), which comprises a body ply assembly (3) of at least one body ply that is partially folded onto itself and therefore having two lateral flaps, within each of which an edge (19) of the body ply assembly (3) rests against an intermediate portion of the body ply assembly (3) itself;
two annular beads (4), each of which is surrounded by the body ply assembly (3) including a respective one of the two lateral flaps and has a bead core (5) and a bead filler (6);
an annular tread (7);
a tread belt (8) comprising at least one tread ply (9);
a pair of sidewalls (11) each arranged externally to the body ply assembly (3) between the tread (7) and a respective one of the two annular beads (4);
a pair of abrasion gum strips (12) each arranged externally to the body ply assembly (3), extending radially more to the inside of a respective one of the pair of sidewalls (11), and at the respective one of the two annular beads (4);
an innerliner (10) which is impermeable to air and arranged internally to the body ply assembly (3); and
a transponder (13) which is arranged in contact with the body ply assembly (3) so that a portion of the transponder (13) is radially at a same level as the edge (19) of one of the two flaps of the body ply assembly (3);
wherein the transponder (13) is arranged between the body ply assembly (3) and the innerliner (10) and therefore the transponder (13) is laterally bordering and in direct contact with the body ply assembly (3) on the external side and is laterally bordering and in direct contact with the innerliner (10) on the inner side; and
wherein a first radial distance (D1) of less than 7 mm is provided between a radially external end of the transponder (13) and the edge (19) of the body ply assembly (3) and a second radial distance (D2) of less than 7 mm is provided between a radially inner end of the transponder (13) and the edge (19) of the body ply assembly (3).

2. The pneumatic tyre (1) according to claim 1, wherein a third radial distance (D3) greater than 10 mm is provided between a radially internal end of the transponder (13) and a radially outermost edge (20) of the bead filler (6) in the annular bead (4) surrounded by the body ply assembly (3) including the edge (19) of the body ply assembly (3).

3. The pneumatic tyre (1) according to claim 1, wherein a fourth radial distance (D4) greater than 10 mm is provided between a radially external end of the transponder (13) and a closest laterally outermost edge (21) of the tread belt (8).

4. The pneumatic tyre (1) according to claim 1, wherein:
the toroidal carcass (2) further comprises an additional body ply (3b) devoid of flaps, which the additional body ply (3b) externally overlaps the body ply assembly (3a) and ends at the two annular beads (4) without folding in any way around either one of the two annular beads (4).

5. The pneumatic tyre (1) according to claim 4, wherein a fifth radial distance (D5) of between 25 mm and 60 mm is provided between the radially inner end of the transponder (13) and a closest edge (22) of the additional body ply (3b).

6. The pneumatic tyre (1) according to claim 1, wherein the transponder (13) is inserted within a sleeve (17) comprising two strips (18) of rubber, a first strip of the two strips (18) and a second strip of the two strips (18) overlapping and pressing against each other.

7. The pneumatic tyre (1) according to claim 6, wherein the two strips (18) of rubber of the sleeve (17) are 1-2 mm longer and wider than the transponder (13).

8. The pneumatic tyre (1) according to claim 6, wherein a thickness (T) of the sleeve (17) is between 0.6 and 2 mm.

9. The pneumatic tyre (1) according to claim 1, wherein a larger largest dimension of the transponder (13) is arranged circumferentially.

10. The pneumatic tyre (1) according to claim 1, wherein the transponder (13) has a rectilinear form and therefore, within the pneumatic tyre (1), it does not follow the circular progression of all of the other components of the pneumatic tyre (1).

11. The pneumatic tyre (1) according to claim 1, wherein the transponder (13) is arranged within a radial zone wherein the closest sidewall (11) is present and the closest abrasion gum strip (12) is absent.

12. The pneumatic tyre (1) according to claim 1, wherein the body ply assembly (3) includes a first body ply (3a) and a second body ply (3b), the second body ply (3b) being arranged more internally than the first body play (3a) and forming the two lateral flaps surrounding the two annular beads (4), and the first body ply (3a) folding around and partially surrounding the two annular beads (4).

* * * * *